H. S. SOMSEN.
COMBINED LOW WHEELED WAGON AND SLED.
APPLICATION FILED JUNE 16, 1909.
962,266.
Patented June 21, 1910.
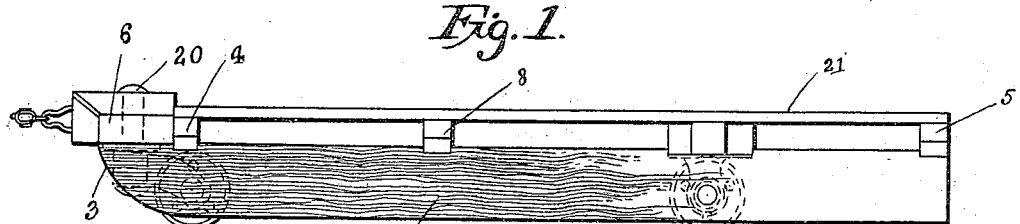
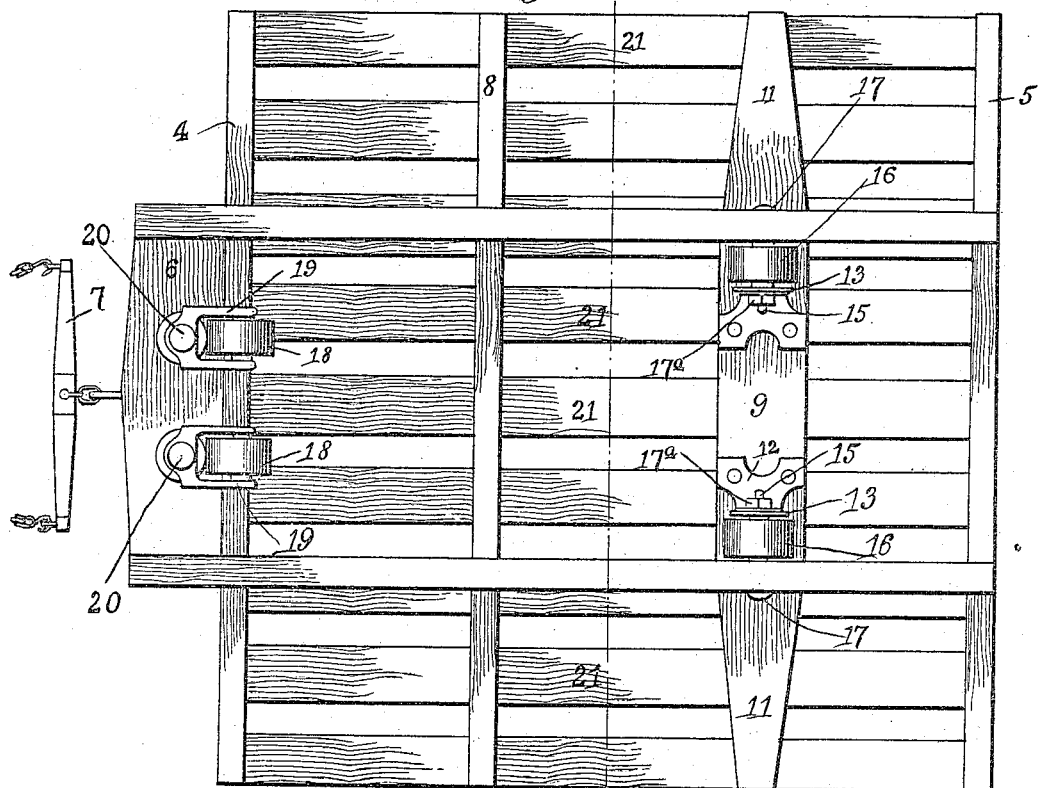
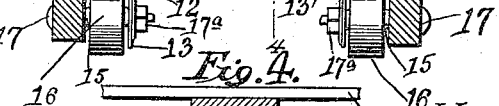
Inventor
Henry S. Somsen

UNITED STATES PATENT OFFICE.

HENRY S. SOMSEN, OF RAYMOND, IDAHO.

COMBINED LOW-WHEELED WAGON AND SLED.

962,266.

Specification of Letters Patent. Patented June 21, 1910.

Application filed June 16, 1909. Serial No. 502,539.

*To all whom it may concern:*

Be it known that I, HENRY S. SOMSEN, a citizen of the United States, residing at Raymond, in the county of Bear Lake and State of Idaho, have invented certain new and useful Improvements in Combined Low-Wheeled Wagons and Sleds, of which the following is a specification, reference being had therein to the accompanying drawing.

This invention relates to farm wagons or trucks, and has specially in view certain improvements therein which facilitate the using of the same in localities where the ordinary farm wagon can not be used.

With the above and other objects in view the invention contemplates a wagon or truck in which the side supports or sills of the same are so arranged relatively to the wheels that they serve as guards to prevent the wheels sinking too far in the ground, and also serve as runners to facilitate the crossing of gullies, ditches or the like.

In carrying out the objects of the invention generally stated above it will be understood that changes in details and structural arrangements may be resorted to without departing from the spirit and scope of the invention, a preferred and practical embodiment of the same being shown in the accompanying drawings, wherein—

Figure 1 is a side elevation of the improved farm wagon or truck. Fig. 2 is a bottom plan view. Fig. 3 is a cross sectional view taken on the line 2—2, Fig. 2. Fig. 4 is a sectional view taken on the line 4—4, Fig. 3.

Like characters of reference designate corresponding parts.

The improved farm wagon or truck is composed essentially of a rectangular frame the side members 1 of which have their front ends curved upwardly, as indicated at 3, and said members 1 are connected together at their front and rear portions by means of the stringers 4, 5, respectively, the ends of which project beyond said side members. At their extreme front ends said side members are also connected by a front bolster 6 which preferably rests upon and is securely bolted to, the top edges of the said side members, and to which is connected a swingletree 7, the connection between the swingletree and the said bolster being the usual or any preferred swivel connection. It will be observed that the shape of the side members is similar to the ordinary sled runners and that the bottom edge of the same is sufficiently wide enough to prevent the said members sinking into the ground, the function of which will presently appear.

An intermediate stringer 8 is arranged across the said side members 1 at a point slightly forward of their centers, said stringer having its ends projected beyond the said side members similar to the front and rear stringers 4 and 5. A rear wheel bolster also extends across said side members and has its ends projected in a manner similar to the described stringers, said bolster having a widened central portion 9 which rests on said side members and reduced tapering ends, as indicated at 11.

Referring more particularly to Figs. 2 and 3, it will be seen that the widened portion of the bolster carries two right angle brackets, said brackets being arranged on the bolster at its under side and one being adjacent to each of the side members. The brackets are provided with a flat base portion 12 which is bolted or otherwise securely attached to said bolster and is of such a size that it extends entirely across the same, and have their free end upturned at right angles to said base, as indicated at 13 and through which an opening 14 is formed for the reception of one end of the axle 15 of the wheels 16, the other end of said axle passing through the side member and being headed, as indicated at 17. The usual axle nut 17$^a$ is employed to hold the axle in the journal opening formed in the bracket member 13. It will be observed that the journaling of the wheels 16 in the bracket members and the side members is such that said wheels are held close to said side members and that they project but a slight distance below said side members, whereby the said side members act as guards to prevent any undue sinking of the wheels in the ground.

The front portion of the wagon or truck is supported by means of the wheels 18 which are mounted in caster brackets 19 which have a pivotal connection 20 with the front bolster of the wagon or truck. Said front wheels are arranged closer together than the rear wheels, and owing to their pivotal mounting in the front bolster, will rotate to permit the necessary turning of the vehicle, as will be obvious.

The stringers 4, 5, and 8, and the rear bolster are connected by means of the spaced apart planks 21, said planks forming a flooring which extends out to the extreme projected ends of said stringers and bolster, which forms a load-carrying surface of almost double the width of the space between the side members thereby adapting the wagon or truck for the carrying of extremely large loads, which owing to the slight height of the entire vehicle from the ground has little or no danger of capsizing.

From the foregoing description it will be seen that the described wagon or truck is one that can be readily used on rough, soft, or mossy ground without danger of the same sinking therein or being capsized for the reason that when conditions are such that the wheels are practically inoperative, the side members act as runners in a manner similar to sleds.

Claims:—

1. A farm wagon or truck comprising spaced apart side runners having stringers mounted thereon the ends of which project beyond the sides of said runners, flooring planks supported by said stringers, a front bolster having supporting wheels pivotally mounted therein, a bolster carried by the rear portion of said runners, journal brackets carried by said last mentioned bolster, and supporting wheels mounted in said journal brackets and said runners, said wheels being in proximity to said runners and projecting a slight distance below the plane of the bottom edges thereof whereby said runners act as guards for said wheels.

2. A farm wagon or truck comprising spaced apart side members forming runners, a flooring supported by said runners, a front bolster carried by said runners, wheels pivotally mounted in said front bolster, a rear bolster also supported by said runners, journal brackets carried by said rear bolster, said brackets being arranged adjacent to each runner, an axle journaled in each side runner and each bracket, and a wheel carried by each axle, said wheels being arranged so that they will project a slight distance beyond the plane of the bottom edges of the runners, whereby the latter prevent the wheels from unduly sinking in the ground.

In testimony whereof I hereunto affix my signature in presence of two witnesses.

HENRY S. SOMSEN.

Witnesses:
L. J. DUMBAY,
J. P. SULLIVAN.